2,827,459

PIPERAZINE DERIVATIVES

Raymond Jacques Horclois, Malakoff, and Edouard Suau, Choisy-le-Roi, France, assignors to Société des Usines Chimiques Rhone-Poulenc, Paris, France, a French body corporate No Drawing. Application December 26, 1956
Serial No. 630,469

Claims priority, application France October 18, 1954

6 Claims. (Cl. 260—243)

This invention relates to new piperazine derivatives of value as therapeutic agents and more particularly to phenthiazinylalkyl-piperazine compounds having such value.

It is known that certain 10-aminoalkyl-phenthiazines possess interesting therapeutic properties. Extensive research and experimentation has shown, however, that both the size of the therapeutic index and the nature of the therapeutic effect exhibited by certain compounds of this type can be changed radically or even eliminated by what would appear to be merely small changes in their chemical structure or their chemical composition. These changes in therapeutic effects, unfortunately, cannot be correlated at present with changes in molecular configuration, hence it is not possible to forecast what will occur when the structure of a compound having certain recognised properties is altered. Particularly is this the case with these phenthiazines when variations are made in the nature and length of the side chain attached to the 10-position nitrogen atom.

In accordance with the present invention, new phenthiazine derivatives are provided which are found to possess particularly interesting pharmacological properties. More particularly, as compared to phenthiazine derivatives previously known, it is found that these compounds possess outstanding utility as potentiators of general anaesthetics such as ether and hexobarital, potentiators of analgesics such as morphine and as spasmolytics.

The new compounds of the present invention are the 1-(10-phenthiazinylalkyl)-4-aminoalkyl piperazines of the general formula:

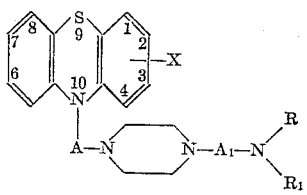

and their acid addition and quaternary ammonium salts. In the foregoing formula X represents a member of the class consisting of hydrogen and halogen atoms and alkyl and alkoxy groups containing at most 4 carbon atoms, A and $A_1$ each represent a divalent saturated straight or branched chain aliphatic group containing from 2 to 3 carbon atoms, R and $R_1$ when individual groups each represent a member of the class consisting of alkyl groups containing at most 4 carbon atoms, cycloalkyl groups and hydrogen such that only one of R and $R_1$ may represent hydrogen, and R and $R_1$ when taken together with the adjacent nitrogen atom collectively represent a heterocyclic group selected from the class consisting of pyrrolidino, piperidino and morpholino. The piperazine nucleus may also be substituted by one or more alkyl groups containing at most 4 carbon atoms.

The aforesaid compounds may be prepared by the following processes:

(1) Interaction of a phenthiazine of the general formula:

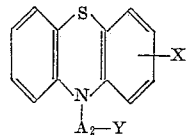

with a piperazine derivative of the general formula:

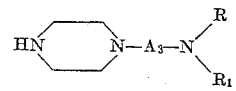

Y representing the residue of a reactive ester (e. g. a halogen atom or a sulphuric or sulphonic ester radical such as a p-toluene sulphonate radical) and the other variables being as hereinbefore defined.

(2) Interaction of a phenthiazine of the general formula:

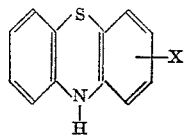

with a piperazine derivative of the general formula:

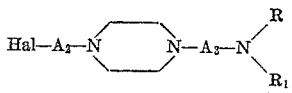

wherein Hal represents a halogen atom and the other variables are as hereinbefore defined.

The aforesaid processes may be carried out by heating the reactants in the presence or absence of a solvent and, if desired, in the presence of a condensing agent, such as an alkali metal or one of its derivatives (hydroxide, hydride, amide, alcoholate or organo-metallic derivatives, and more particularly sodium, potassium or sodamide).

(3) Reacting a piperazine of the formula:

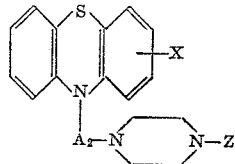

with an amine of the formula

In these formulae, X, $A_2$, R and $R_1$ are as hereinbefore defined and Z and T are atoms or groups capable of forming the linkage —$A_3$— as hereinbefore defined. Z may, for example, represent a group —$A_3$—Y, Y being as hereinbefore designated, and T a hydrogen atom. Z may also represent a hydrogen atom and T a group —$A_3$—Y. These reactions are carried out under the same conditions as the previously described processes and should be considered equivalent thereto.

It will be appreciated that when the grouping Z or T is a branched hydrocarbon chain e. g. —$CH_2CH(CH_3)$— or —$CH(CH_3)CH_2$—, isomerisation can occur at one stage or another of the processes with the simultaneous production of two isomers. These two isomers can readily be separated in a manner known per se; for example, by conversion of the bases into hydrochlorides, fractional crystallisation of the hydrochlorides from a suitable solvent and, if the free bases are required, treatment of the individual isomers thus separated with caustic alkali.

By way of illustration of the use of groups convertible into groups A and $A_1$ the following examples are given of intermediates which can be prepared by the aforesaid processes and converted by reduction of the carbonyl group(s) by known methods, preferably using lithium aluminium hydride in a solvent such as tetrahydrofuran, into piperazines having the general Formula I:

(a)

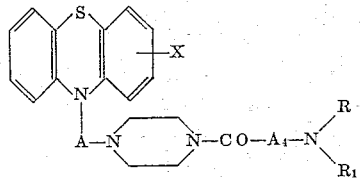

VII the group $A_4$ being an aliphatic hydrocarbon group containing 1 to 2 carbon atoms and the other variables being as hereinbefore defined.

(b)

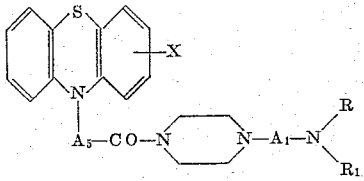

VIII the group $A_5$ being an aliphatic hydrocarbon group containing 1 to 2 carbon atoms and the other variables being as hereinbefore defined.

(c)

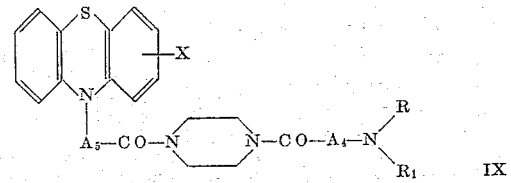

IX

Acid addition salts of the bases of Formula I containing pharmaceutically acceptable anions, such as the hydrochloride or other hydrohalide salts, 8-chlorotheophyllinate, phosphate, nitrate, sulphate, maleate, furamate, citrate, tartrate, oxalate, methane sulphonate and ethane disulphonate; and quaternary ammonium salts, obtained by reaction of the base with an organic halide, e. g. methyl or ethyl iodide, chloride or bromide, or allyl or benzyl chloride or bromide, or other reactive esters, are particularly satisfactory therapeutically acceptable forms for facilitating administration of the bases. Reference herein to salts of a base is to be understood as having this particular and limited significance.

The present invention includes within its scope pharmaceutical preparations containing one or more of the compounds of Formula I or salts thereof in association with a diluent compatible therewith. Such preparations may take the form of tablets, aqueous or alcoholic solutions, suspensions or syrups. The compounds may also be administered in the form of gelatin capsules. The parenteral route may also be used in the form of ampoules of injectable aqueous solutions of a non-toxic salt. The products may also be administered in the form of suppositories. The daily doses for an adult are generally between 10 and 500 mg. by oral or rectal route, from 10 to 150 mg. by the intramuscular route and from 5 to 50 mg. by the intravenous route.

The following examples show how the invention may be put into practice. The melting points are those obtained using the Kofler block.

*Example I*

10-(2-1'-piperazinylethyl)phenthiazine (6.2 g.) is heated for 1½ hours under reflux with sodamide (0.9 g.) in xylene (30 cc). A xylene solution (10 cc.) containing diethylaminochloroethane (4 g.) is added and the mixture is heated under reflux for 5 hours. After cooling the mixture is treated with water (40 cc.), the liquors are decanted and dried over sodium sulphate and the xylene is removed in vacuo. A base (7 g.) is thus obtained from which the maleate is prepared, using ethyl acetate (300 cc.) and maleic acid (9.3 g.), and recrystallised from water (100 cc.). 1-(2-10'-phenthiazinylethyl) - 4 - (2-diethylaminoethyl)piperazine trimaleate (6.7 g.) is obtained, M. P. 195° C.

*Example II*

Proceeding as in Example I but commencing with dimethylaminochloroethane, 1-(2-10'-phenthiazinylethyl)-4-(2-dimethylaminoethyl)piperazine trimaleate (4 g.) is obtained, M. P. 232° C.

*Example III*

Proceeding as in Example I but commencing with 1-dimethylamino-2-chloropropane, a mixture (5 g.) of 1-(2-10'-phenthiazinylethyl)-4-(2-dimethylaminopropyl)piperazine hydrochloride and 1-(2-10'-phenthiazinylethyl)-4-(3-dimethylamino-2-propyl)piperazine hydrochloride is obtained, the tripicrate of which melts at 125° C. with decomposition.

*Example IV*

Proceeding as in Example I using 1-diethylamino-2-chloropropane, there is obtained a mixture (5 g.) of 1 - (2 - 10' - phenthiazinylethyl) - 4 - (2 - dimethylamino propyl)-piperazine hydrochloride and 1-(2-10'-phenthiazinylethyl)-4-(3-diethylamino-2-propyl)piperazine hydrochloride, the tripicrate of which melts at 105° C. with decomposition.

*Example V*

A mixture of 10-(2-chloroethyl)phenthiazine (5.2 g.) and 1-(3-diethylaminopropyl)piperazine (20 g.) is heated for 5 hours at 200° C. After cooling the mixture is treated with water (50 cc.) and ether (50 cc.). The ethereal layer is extracted with 10% hydrochloric acid (25 cc.), the acidic aqueous layer is made alkaline with sodium hydroxide ($d=1.33$; 20 cc.) and the base is extracted with ether (3×20 cc.). The combined ethereal solutions are dried and evaporated in vacuo. The base thus obtained (6.5 g.) is converted to the hydrochloride. By recrystallisation from isopropanol (300 cc.) 1-(2-10'-phenthiazinylethyl)-4-(3 - diethylaminopropyl)piperazine trihydrochloride (6 g.) is obtained, M. P. 220° C.

*Example VI*

Sodamide (1.3 g.) is added to a solution of 3-chlorophenthiazine (7 g.) in xylene (50 cc.), heated to 130° C. and the mixture is heated for 1½ hours under reflux. A solution of 1 - (3 - chloropropyl)-4-(3-diethylaminopropyl)piperazine (9.6 g) in xylene (20 cc.) is added over ½ hour and heating under reflux is continued for 3 hours. After cooling, the mixture is treated with water (50 cc.) and ether (50 cc.); the ethereal layer is extracted with 7% hydrochloric acid (80 cc.) and the acidic aqueous layer is made alkaline with caustic soda ($d=1.33$; 30 cc.). The base is extracted with chloroform (150 cc.), the solution is dried and the solvent is evaporated. The base thus obtained (12 g.) gives, on treatment with ethereal hydrogen chloride, 1,(3-3'-chloro - 10' - phenthiazinylpropyl) - 4 - (3-diethylaminopropyl)piperazine trihydrochloride (13.7 g.), M. P. 266° C. The trimaleate of this base melts at 176° C.

1 - (3 - chloropropyl)-4-(3-diethylaminopropyl)piperazine, B. P. 157–158°/3 mm. Hg, may be prepared by condensing 1-chloro-3-bromopropane (13.4 g.) with 1-(3-diethylaminopropyl)piperazine in anhydrous ether (100 cc.).

*Example VII*

10-(2-1'-piperazinylethyl)phenthiazine (15.5 g.) is heated for 1½ hours under reflux with sodamide (3.5 g.) in xylene (100 cc.). A solution of 1-piperidino-2-chloroethane (9 g.) in xylene (30 cc.) is added and the mixture is heated under reflux for 4 hours. After the addition of distilled water (70 cc.), decanting and washing with benzene (40 cc.), the xylene and benzene layers are combined and concentrated in vacuo. A crude base (16.5 g.) is obtained, which is treated with maleic acid (14 g.) in ethyl acetate (150 cc.). 1-(2-10'-phenthiazinylethyl) - 4 - (2-piperidinoethyl)piperazine trimaleate (25.7 g.) is obtained, which melts at 245° C. after recrystallisation from water.

1-(2 - 10' - phenthiazinylethyl)-4-(2-piperidinoethyl)-piperazine (2.4 g.) is heated with methyl iodide (15 cc.) for 1 hour under reflux and 1-(2-10'-phenthiazinylethyl)-4-(2-piperidinoethyl)piperazine trimethiodide (2.7 g.) is obtained, M. P. 202° C. (dec.), after recrystallisation from ethanol.

*Example VIII*

Proceeding as in Example VII, but commencing with 3-chloro - 10 - (2-1'-piperazinylethyl)phenthiazine (15.5 g.), sodamide (2.5 g.) and 1-morpholino-2-chloroethane (9 g.), a crude base (16.3 g.) is obtained which, on treatment with maleic acid (12.5 g.) and recrystallisation of the product from water, yields 1-(2-3'-chloro-10'-phenthiazinylethyl)-4-(2-morpholinoethyl)piperazine trimaleate (15 g.), M. P. 220° C.

1 - (2-3' - chloro - 10' - phenthiazinylethyl)-4-(2-morpholinoethyl)piperazine (1.84 g.) is heated under reflux with theophyllineacetic acid (3.3 g.) in ethanol (30 cc.) and water (10 cc.). Concentration in vacuo of the solution obtained yields 1-(2-3'-chloro-10'-phenthiazinylethyl)-4-(2-morpholinoethyl)-piperazine tri-theophyllineacetate (5 g.), M. P. 140° C., which is soluble in water.

*Example IX*

10-(2-chloropropyl)phenthiazine (13 g.) is heated with 1-(2-dimethylaminoethyl)piperazine (7.5 g.) for 5 hours at 200° C. 9% hydrochloric acid (50 cc.) and chloroform (40 cc.) are added and the aqueous acid solution is made alkaline with sodium hydroxide (d=1.33; 30 cc.). The base is extracted with chloroform (3×25 cc.) and, on evaporation, the crude base (6.5 g.) is obtained, which is treated with maleic acid (6 g.) in ethyl acetate (150 cc.), 1 - (1-10'-phenthiazinyl- 2 - propyl)-4-(2-dimethylaminoethyl)piperazine trimaleate (7 g.) is obtained, M. P. 194° C., after recrystallisation from methanol.

*Example X*

3-methoxyphenthiazine (6.9 g.) is heated for 1 hour under reflux with sodamide (1.6 g.) in xylene (70 cc.). A solution of 1-(2-dimethylaminoethyl)-4-(3-chloropropyl)piperazine (8.5 g.) in xylene (10 cc.) is then added dropwise over 1 hour. The mixture is then heated for 5 hours under reflux and is treated in the cold with water (100 cc.) and ether (100 cc.). The organic layer is decanted and treated with 7% hydrochloric acid (100 cc.). The aqueous layer is then decanted, sodium hydroxide (d=1.33; 40 cc.) is added and the base is extracted with ether (2×50 cc.). Treatment of the base with maleic acid (1.4 g.) yields 1-(3-3'-methoxy-10'-phenthiazinylpropyl)-4-(2 - dimethylaminoethyl)piperazine trimaleate (1.4 g.), M. P. 182° C. after recrystallisation from ethanol.

1 - (2 - dimethylaminoethyl)-4-(3-chloropropyl)piperazine is obtained by liberating the base from the trihydrochloride, M. P. 260° C., itself obtained by the action of thionyl chloride in chloroform upon 1-(2-dimethylaminoethyl)-4-(3-hydroxypropyl)piperazine hydrochloride.

The last mentioned base, B. P. 145–147° C./mm. Hg, is obtained by heating 3-chloro-1-propanol (6 g.) with 1-(2-dimethylaminoethyl)piperazine (20 g.) (prepared according to Hromatka and Kraupp M. 82, 895 (1951)) for 1 hour at 130° C.

*Example XI*

Proceeding as in Example VII but commencing with 3-chloro-10-(3-1'-piperazinylpropyl)phenthiazine (8 g.), sodamide (1.1 g.) and 1-1'-pyrrolidinyl-3-chloropropane (4 g.), a base (8 g.) is obtained which, on treatment with maleic acid (7 g.) in ethyl acetate (150 cc.), yields 1-(3-3'-chloro - 10' - phenthiazinylpropyl) - 4 - (3-1'-pyrrolidinyl)propyl)piperazine trimaleate (8 g.), M. P. 195–200° C., after recrystallisation from ethanol.

*Example XII*

1-(2-10'-phenthiazinylethyl)-4-(3-chloropropyl)piperazine dihydrochloride (6 g.) is heated with piperidine (13.6 g.) for 8 hours on a boiling water bath. Water (50 cc.) is added and the mixture is extracted with benzene (50 cc. followed by 2×25 cc.). After drying and concentrating, the base obtained (8 g.) is treated with maleic acid (4.5 g.) and ethyl acetate (100 cc.) and 1-(2-10'-phenthiazinylethyl) - 4 - (3 - piperidinopropyl)-piperazine trimaleate (8 g.) is obtained, M. P. 193° C., after recrystallisation from methanol.

1-(2-10'-phenthiazinylethyl)-4-(3-chloropropyl)piperazine dihydrochloride, which is hygroscopic and melts at about 200° C. is obtained by the action of thionyl chloride in benzene on 1-(2-10'-phenthiazinylethyl)-4-(3-hydroxypropyl)piperazine followed by treatment with ethereal hydrogen chloride.

The hydroxy base referred to, B. P. 260–280° C./0.5 mm. Hg, is obtained by heating 3-chloro-1-propanol with 10-(2-1'-piperazinylethyl)phenthiazine for two hours at 140° C. and treating the product with sodium ethylate.

*Example XIII*

Proceeding as in Example XII but replacing piperidine with monocyclohexylamine, 1 - (2 - 10' - phenthiazinylethyl)-4-(3 - cyclohexylaminopropyl)piperazine trihydrochloride is obtained, M. P. 230° C., after recrystallisation from isopropanol.

*Example XIV*

1-(2-3'-chloro-10'-phenthiazinylethyl) - 4 - piperidinoacetylpiperazine (6.5 g.) is reduced in tetrahydrofuran (30 cc.) with a 1.8% ethereal solution (45 cc.) of lithium aluminium hydride added over ½ hour. The mixture is heated under reflux for 6 hours, left overnight at 20° C. and then treated successively with water (1 cc.), 15% sodium hydroxide (1 cc.) and water (4 cc. followed by 4 cc. and 30 cc.). Ether (100 cc.) is then added and the mixture is filtered through Supercel and extracted with ether (3×50 cc.). The ethereal layer is dried over sodium sulphate and concentrated and a crude base (6.5 g.), is obtained which is then treated with maleic acid (3.5 g.) in ethyl acetate (70 cc.). The product is recrystallised from a mixture of ethanol (350 cc.) and water (45 cc.), and 1-(2-3'-chloro-10'-phenthiazinylethyl) - 4 - (2 - piperidinoethyl)piperazine trimaleate (5.4 g.), M. P. 240° C., is obtained.

1-(2-3'-chloro-10'-phenthiazinylethyl) - 4 - piperidinoacetylpiperazine, dipicrate, M. P. 130° C., is obtained by heating piperidine with 1-(2-3'-chloro-10'-phenthiazinylethyl)-4-chloroacetylpiperazine for 5 hours on a water bath. The last mentioned product is prepared by heating chloroacetyl chloride with 3-chloro-10-(2-1'-piperazinylethyl)phenthiazine in toluene under reflux for 2 hours.

*Example XV*

Proceeding as in the preceding example but replacing the piperidine with monocyclohexylamine, 1-(2-3'-chloro-10'-phenthiazinylethyl)-4 - (2 - cyclohexylaminoethyl)piperazine trimaleate is obtained, M. P. 216° C. after recrystallisation from ethanol.

1-(2-3'-chloro-10' - phenthiazinylethyl) - 4 - 1' - cyclohexylaminoacetylpiperazine dimaleate melts at 134° C.

Of the compounds of the present invention, the bases (and their salts) of Examples I, II, VI, XI and XIII are of outstanding importance, the compound of Example XI being of primary interest.

This application is a continuation-in-part of application Serial No. 536,761, filed September 26, 1955, and now abandoned.

We claim:
1. As a new composition of matter a substance selected from the group consisting of the piperazine bases of the general formula:

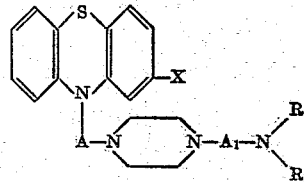

wherein X represents a member of the class consisting of hydrogen and halogen atoms and alkyl and alkoxy groups containing at most 4 carbon atoms, A and $A_1$ each represent a divalent saturated wholly hydrocarbon aliphatic group containing from 2 to 3 carbon atoms, R and $R_1$ taken separately each represent a member of the class consisting of alkyl containing at most 4 carbon atoms, cyclohexyl and hydrogen, only one of R and $R_1$ representing hydrogen, and taken together represent with the adjacent nitrogen atom a heterocyclic group selected from the class consisting of pyrrolidino, piperidino and morpholino groups, and salts of the said bases having pharmaceutically acceptable anions.

2. The compound 1 - (2-10'-phenthiazinylethyl)-4-(2-diethylaminoethyl)piperazine.

3. The compound 1-(2-10'-phenthiazinylethyl)-4-(2-dimethylaminoethyl)piperazine.

4. The compound 1 - (3 - 3'-chloro-10'-phenthiazinylpropyl)-4-(3-diethylaminopropyl)piperazine.

5. The compound 1 - (3 - 3'-chloro-10'-phenthiazinylpropyl)-4-(3-1'-pyrrolidinylpropyl)piperazine.

6. An acid addition salt of the compound of claim 5 that contains a pharmaceutically acceptable anion.

References Cited in the file of this patent

FOREIGN PATENTS 203,708     Australia _____ Oct. 20, 1955